United States Patent [19]

Ackeret

[11] Patent Number: 4,860,472
[45] Date of Patent: Aug. 29, 1989

[54] PICTURE VIEWING DEVICE

[75] Inventor: Peter Ackeret, Kusnacht, Switzerland

[73] Assignee: Licinvest AG, Chur, Switzerland

[21] Appl. No.: 104,868

[22] PCT Filed: Dec. 13, 1986

[86] PCT No.: PCT/EP86/00749
§ 371 Date: Aug. 13, 1987
§ 102(e) Date: Aug. 13, 1987

[87] PCT Pub. No.: WO87/03971
PCT Pub. Date: Jul. 2, 1987

[30] Foreign Application Priority Data

Dec. 20, 1985 [DE] Fed. Rep. of Germany ....... 3545164

[51] Int. Cl.[4] .............................................. G09F 11/30
[52] U.S. Cl. ......................................... 40/513; 40/511; 40/490
[58] Field of Search ................... 40/513, 511, 490, 155

[56] References Cited

U.S. PATENT DOCUMENTS

| 4,057,920 | 11/1977 | Weggeland | 40/511 X |
| 4,413,435 | 11/1983 | Bauer | 40/155 |
| 4,546,651 | 10/1985 | Ackeret | 40/513 |

Primary Examiner—Robert Peshock
Assistant Examiner—Cary E. Stone
Attorney, Agent, or Firm—Robert R. Jackson

[57] ABSTRACT

The picture viewing device comprises a housing and a slider member, which may be displaced backwards and forwards relative to one another and parallel to a viewing window, in order thereby to rearrange cyclically a pile of pictures. The pile is located in a removable container which has an opening complementary with the window and openings which allow the pile to be changed. Optionally, components of the change-over mechanism are contained in the container. The container may be formed by the slider member itself.

24 Claims, 13 Drawing Sheets

PICTURE VIEWING DEVICE

The invention relates to a picture viewing device having the features specified in the preamble of patent claim 1. Such devices are known for example from U.S. patent specifications No. 4,238,898, 4,238,899, 4,241,528, 4,241,529, 4,245,417, 4,259,802 and 4,376,348.

In the known picture changers, the relationship between the volume of the pile of picture on the one hand and of the device on the other hand is not constant, since specific minimum dimensions around the pile have to be adhered to for the change-over function. The smaller the area of the picture, therefore, the more unfavourable does the relationship become. If a relatively large collection of pictures needs to be housed, for instance an extensive collection of photographs, then the additional space requirement when all the pictures are housed in picture changers will possibly present problems. On the other hand, the pictures changers not only provide the advantage that viewing is more convenient, but also the advantage that, once the pictures have been put into order, their order remains unchanged because the rearrangement is effected cyclically.

It is the aim of the present invention to produce a viewing device of the type mentioned in the preamble of patent claim 1 in which the overall space requirement can be reduced for a relatively large number of piles of pictures without forgoing the advantages of the rearranging viewing device.

The solution provided according to the invention for solving this problem is defined in the characterising clause of patent claim 1; the subsidiary claims define advantageous developments of this concept.

It is apparent that in contrast to the known viewing devices, in this case three components are provided, of which the two frame parts primarily have the task of permitting the "drive" of the change-over function, and the container primarily has the function of keeping the pile of pictures together outside the viewing device also. The distribution of the other functions, and therewith the accompanying structural components, is possible in a variety of ways as will become apparent from the following description of embodiments.

Before describing the embodiments, the rearrangement or change-over operation shall, with the necessary brevity, be considered somewhat more closely. In principle, the individual picture to be rearranged is to be displaced laterally parallel to the second picture adjacent to it in the pile, until it is located "next to" the pile. It is then to be displaced at right angles to its principal plane until it can be pushed onto the other side of the pile again parallel to the principal plane of the pile behind the last picture of the pile. These individual functions require certain components:

For the first step it is necessary to set the individual picture in motion. Means which are known as the "feed mechanism" are provided for this purpose. Care must be taken that the feed mechanism conveys just a single picture, but that the second picture remains on the pile. To that end a "separating means" is provided which, for example, may be constructed as a through-opening with dimensions for only one picture. During the rest of the change-over process, the separated individual picture is held firmly in one frame part and the other* in the other frame part, for which purpose a "retaining device" is provided. And finally, a "guide means" is provided which shifts the individual picture onto the other side of the pile and enables it to be returned. It should be noted that components that perform several functions may be present, that is to say, for example, operate first as the feed mechanism and in the further course of the change-over cycle as the retaining means, or one part of the separating means acts simultaneously as a retaining means for the remainder of the pile, and so on.

Presumably "the remainder of the pile"—translator.

In the following description of the embodiments, for the sake of simplicity the frame part provided with the viewing window is referred to as the "housing" and the other frame part is referred to as the "slider member", irrespective of which of the two components is the first or second frame part.

Furthermore, in all the embodiments represented, the components described and drawn consist of heat-deformable plastics with the exception of the parts under constant spring stress; these consist of a suitable metal alloy.

Figure 1:
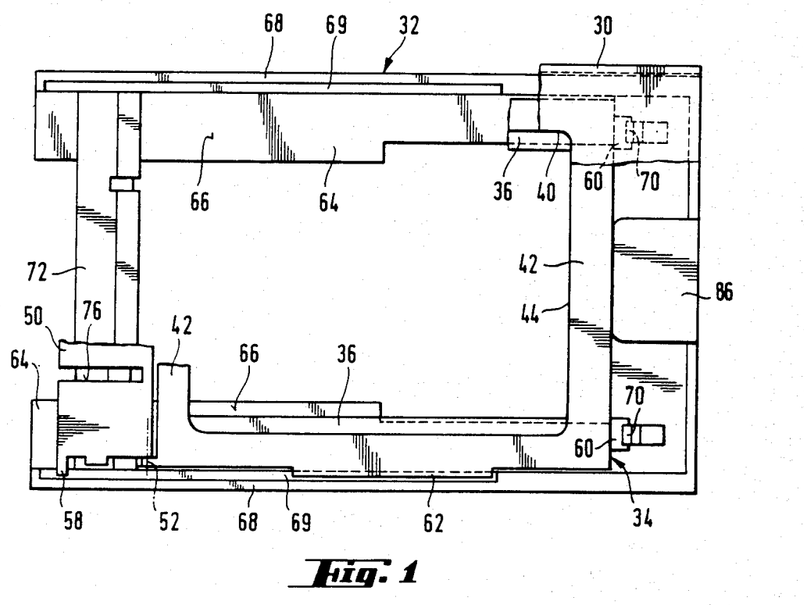
FIG. 1 shows a plan view of a first embodiment, partially cut away.
Figure 2:
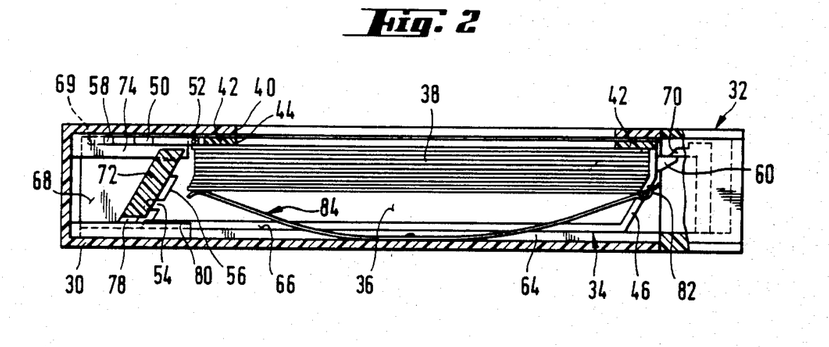
FIG. 2 is a longitudinal section through the viewing device of FIG. 1.
Figure 3:
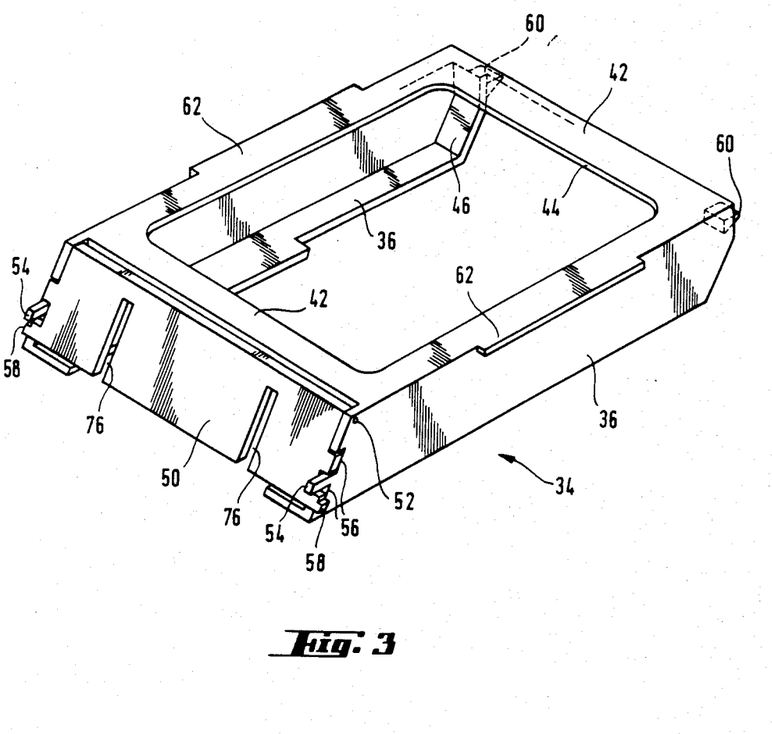
FIG. 3 shows the container of FIG. 1 and FIG. 2 in a perspective view.

FIGS. 1 and 3 show a first embodiment. The device comprises a housing 30, a slider member 32 and a container 34 which may be inserted in the slider member. The container has two longitudinal side members 36 of U-shaped cross-section which engage the longitudinal edges of a pile of pictures 38 and thus hold them together. On its side facing towards the viewing window 40 of the housing in the inserted state the longitudinal side members are joined to one another by transverse panels 42 so that an opening 44 complementary with the window 40 is produced. At one end of the container, the withdrawal end, the pile is prevented from falling out be end pieces 46. At the other end, the container has an opening through which a pile of pictures may be inserted and removed; this opening is covered by a flap 50 which is mounted in the longitudinal side members so as to pivot about journals 52. The base portions in the longitudinal side members have corresponding journal holes and at the free end edge of these base portions there are moulded projections 54 which engage corresponding cut-outs of the flap, and recesses 56 which are complementary with the edge parts of the flap. The latter are additionally provided with two outwardly projecting projections 58. On the side of the container remote from the flap this has hooks 60 moulded on it, and from the upper side of the container narrow bars 62 project outwards. The slider member comprises slider side pieces 64 of L-shaped cross-section with base members 66, on which the container rests, and support arms 68 which are directed towards the viewing window of the housing and have recesses 69 in which the bars 62 and also the projections 58 of the flap are anchored once the flap has been opened. Catches 70 of the slider member snap over the hooks 60, and thus anchor the container in the slider member; at the other end of the container, the projections 54 engage in corresponding recesses in the inner transverse wall of the slider member, which wall is in the form of a separator bar 72. Stop members 74 are moulded on the inside of the housing; these do not prevent the backward and forward movement of the slider member with the container inserted as they are able to engage through slots 76 in the flap of the container. The separator bar has on its underside resilient shoes 78 which, together with a step 80 provided in the housing, form the separating means. Hooks 82 on a pair of springs 84 form the feed mechanism and at the same time hold a picture removed at the underside of the pile, which picture positions itself in front of the stop members 74 when the slider member (together with container) has been fully pulled out, and upon reinsertion of the slider member is pushed between the upper side of the separator bar and the inside of the flap and is guided onto the pile. - To remove the container the catches are released by displacing a plate (not shown) guided along the grip portion 86 of the slider member, and the flap is automatically locked by a spring (not shown). It is obvious that the asymmetry of the container enables it to be inserted only in the correct position.

In this form of embodiment the container serves exclusively for holding the pile; all components required for the change-over process are located in the two frame parts. The container can be inserted in or removed from the slider member when this is pulled out.

Figure 4:
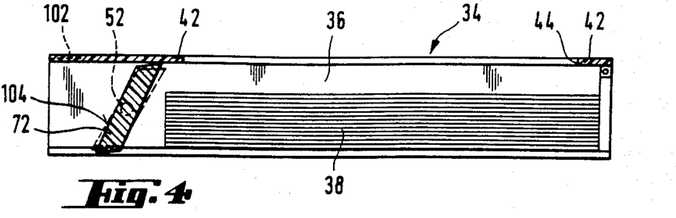
FIGS. 4 and 5 show in longitudinal section and in a perspective view, respectively, the container of a second embodiment.
Figures 5, 6:
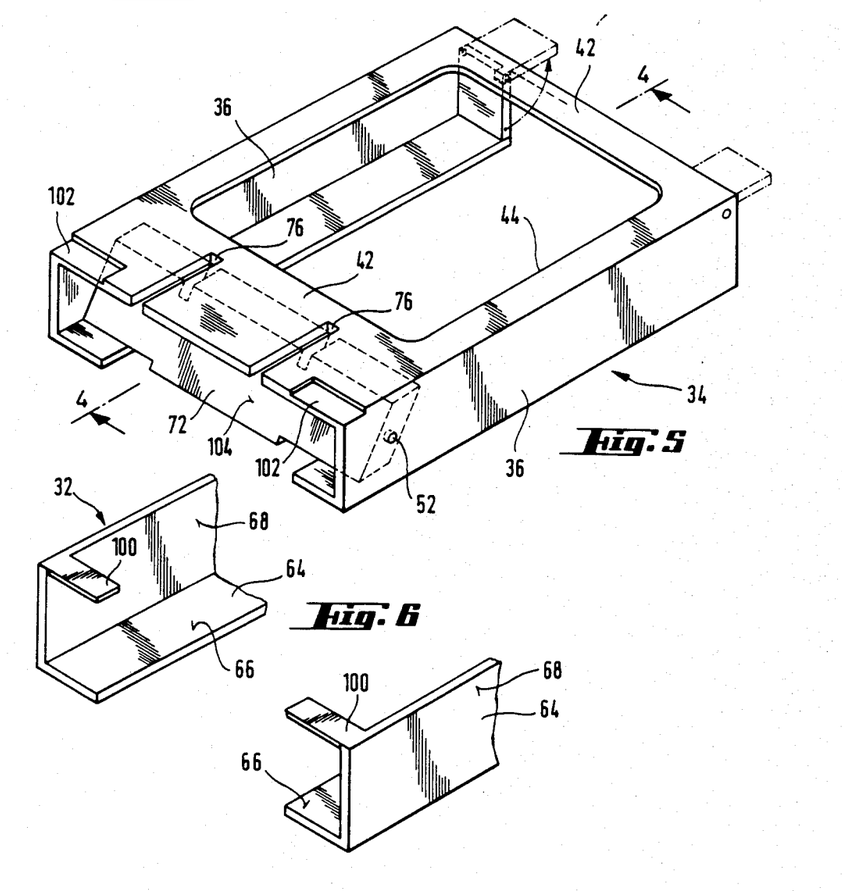
FIG. 6 shows in a perspective view a part of the slider member-frame part.
Figure 7:
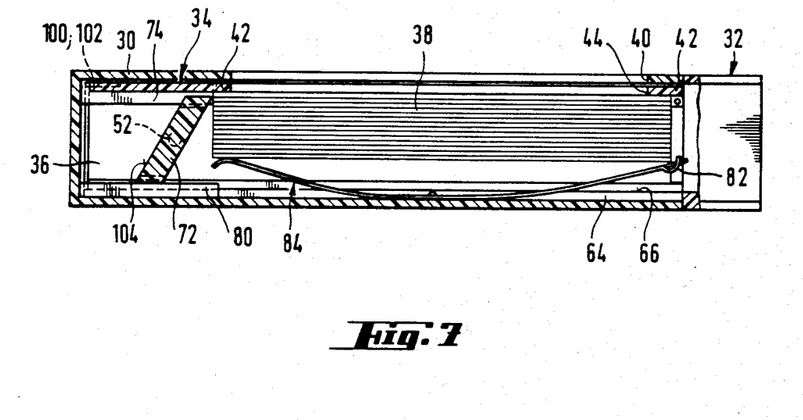
FIG. 7 shows the viewing device with the container of FIGS. 4/5 in longitudinal section.
Figure 8:
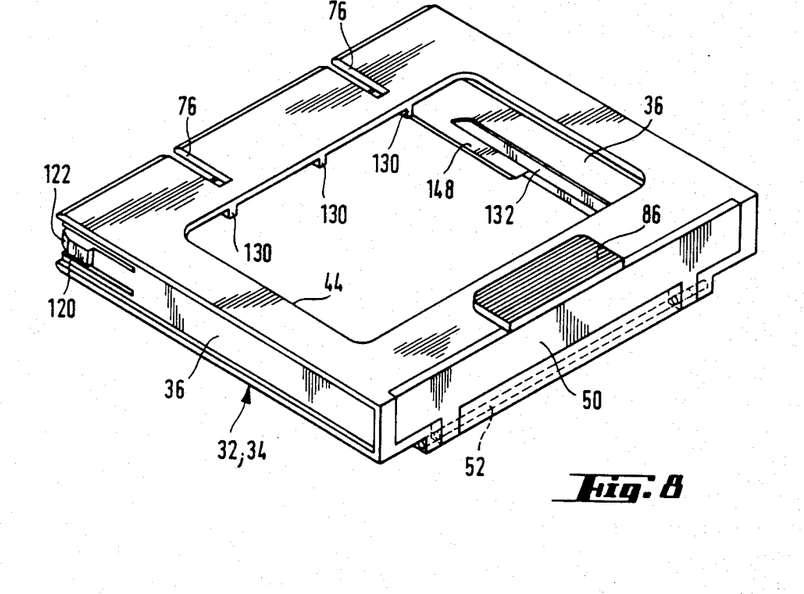
FIG. 8 shows the container of a further embodiment in a perspective view.
Figure 9:
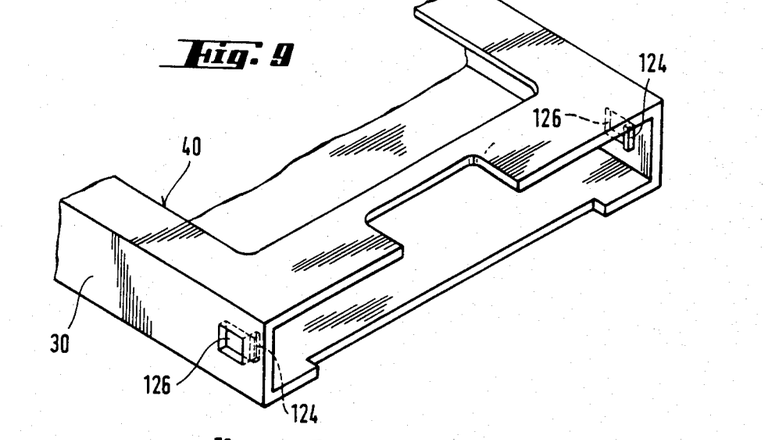
FIG. 9 shows the opening side of the associated housing in a perspective view.
Figure 10:
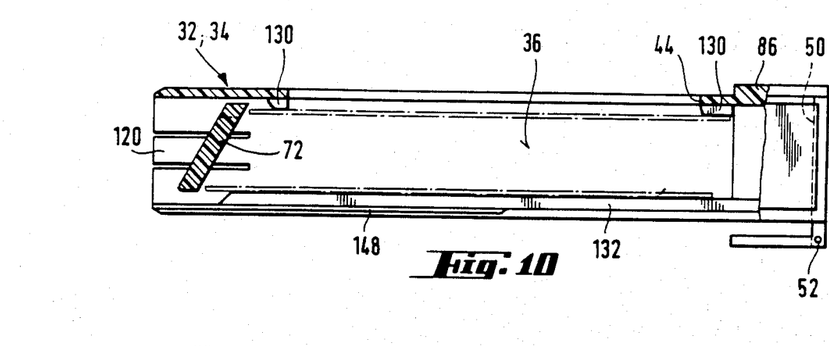
FIGS. 10 and 11 show the parts in FIGS. 8 and 9 respectively in longitudinal section and pulled apart.
Figure 11:
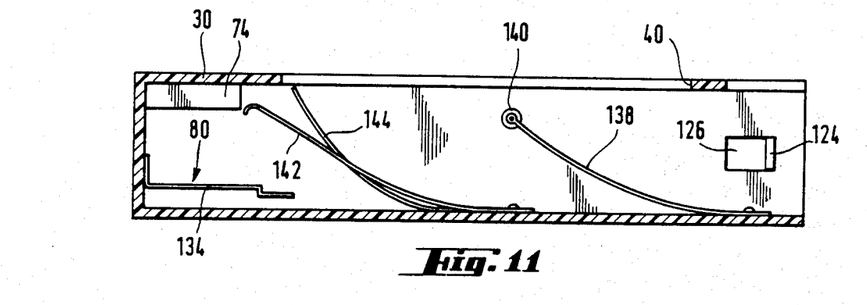
Figure 12:
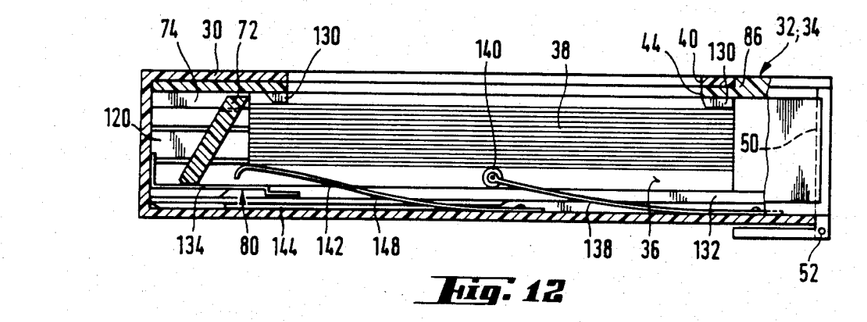
FIG. 12 shows analogously to FIGS. 10/11 the parts in their pushed together position.
Figure 13:
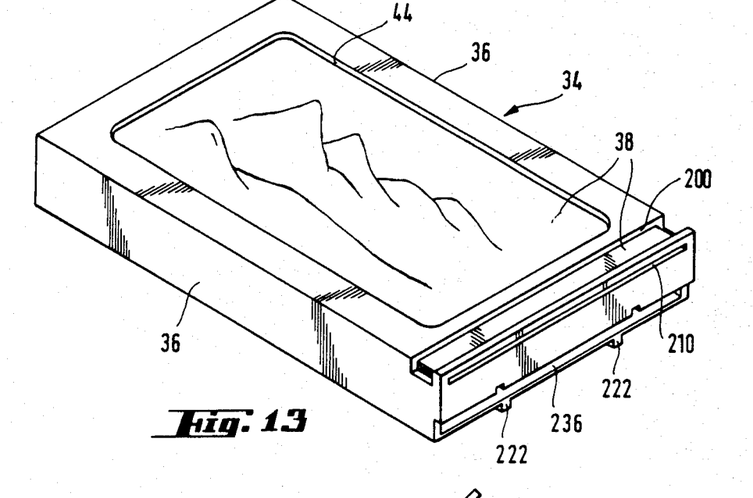
FIG. 13 shows in a perspective view the container of a further embodiment.
Figure 14:
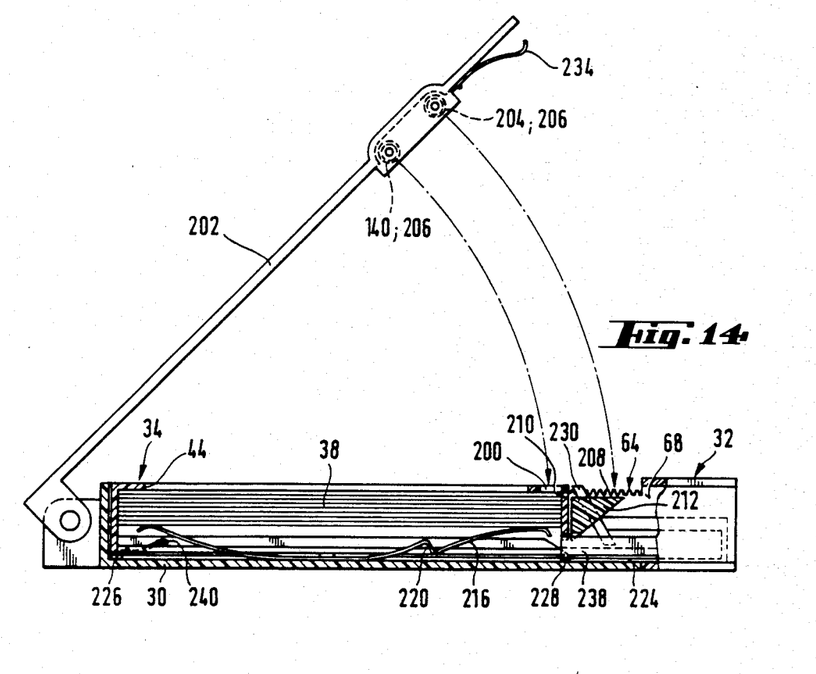
FIG. 14 shows in longitudinal section the accompanying viewing device, open, with the container inside.
Figure 15:
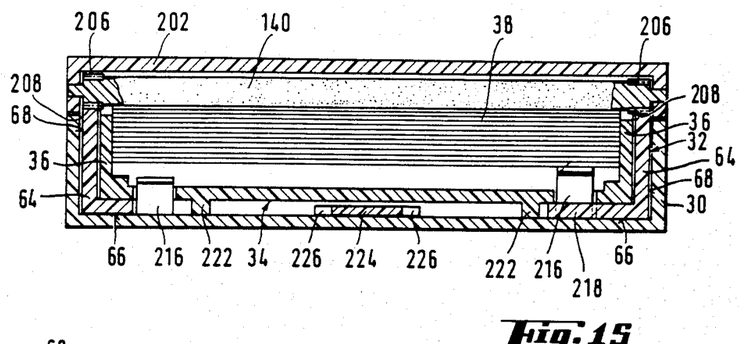
FIG. 15 is a cross-section through the closed device of FIG. 14.
Figure 16:
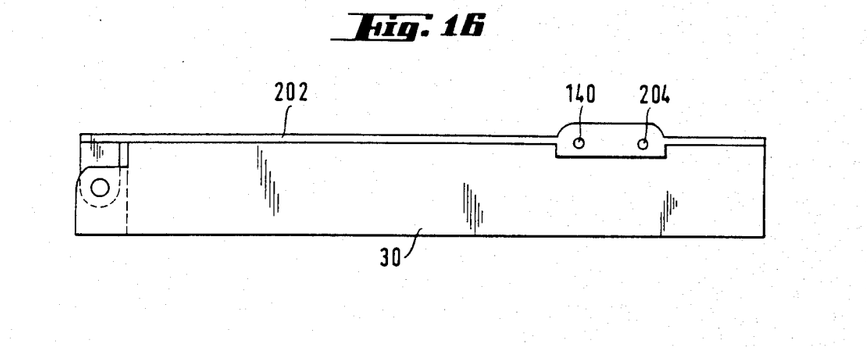
FIG. 16 is a side view similar to FIG. 14, but in the closed state.
Figure 17:
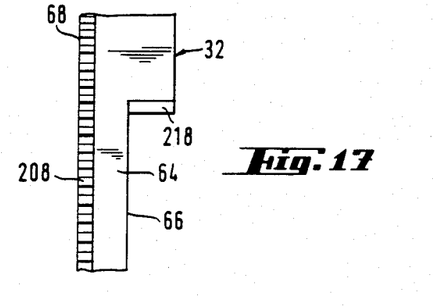
FIG. 17 shows in plan view a detail of the slider member.
Figure 18:
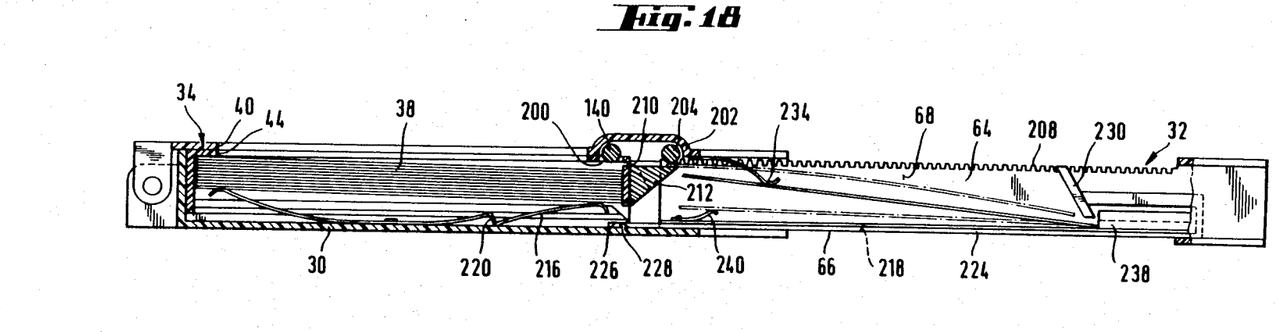
FIG. 18 is a longitudinal section through the device shown in FIG. 15 with the frame parts in the pulled-apart position.
Figure 19:
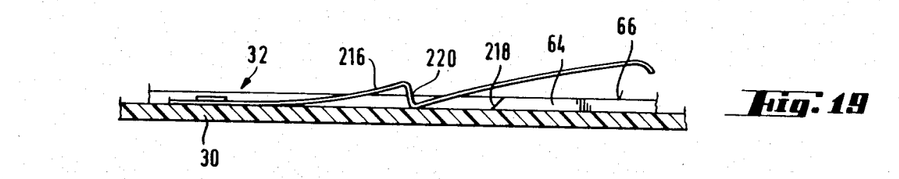
FIGS. 19 and 20 show in side view different operative positions of the slider member detail shown in FIG. 17.
Figure 20:
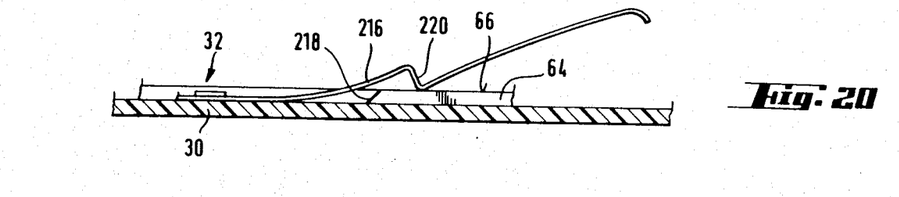

The embodiment shown in FIGS. 4 to 7 differs from the embodiment according to FIGS. 1 to 3 in that the container 34 contains the separator bar 72, which is pivotal about the journals 52 and biased by a spring (not shown) into the position illustrated in solid lines in FIG. 4. A pile of pictures is accordingly inserted at the other end of the container 34, which for this purpose has swing-up covers 50 which are able to lock in the members nearest the base of their longitudinal side pieces when the container is closed; in this way the container may be inserted into the slider member, the inner end of the container being held as a result of projections 100 moulded on the separator engaging in corresponding complementary recesses 102 in the container. The separator bar 72 is also thereby rotated into the position shown in FIG. 4 by broken lines and together with the housing step 80 forms the separating device. The slots 76 for the stop members 74 on the housing are provided in the top wall of the container in this embodiment.

Unlike the first-described embodiment, in this embodiment the container includes in addition components of the separating means (namely, the spring-biased underside of the separator bar facing towards the housing step) and also a part of the guide means, namely the sloping rear 104 of the separator bar along which the edge of the individual picture is guided upwards. The remaining components of the change-over mechanism, however, are located in the housing.

The special feature of the embodiment according to FIGS. 8 to 12 is that the slider member 32 is simultaneously the container 34; accordingly, these components have been marked with both reference numbers in the Figures. The slider member, which in the previously described embodiments, and also in the state of the art, although displaceable backwards and forwards relative to the housing, could not be removed from the housing, can in this case be removed as a whole from the housing. The base members 36 of the longitudinal side pieces are slotted on either side of a stop projection 120 so that this is able to deflect resiliently inwards when the slider member-container component is inserted into the housing 30 and the sloping faces 122 of the projections meet counter stop members 124 behind which the projections deflect resiliently outwards again and limit the withdrawal stroke. For removal, a pointed object or the like is pressed from the outside through the openings 126 onto the projections so that they are able to slide past the counter stop members 124. In addition to the separator bar 72, the slider member-container component 32/34 has holding-down members 130 on the window side which prevent a picture falling out of the slot above the separator bar as the component is removed. The support ribs 132 on the base serve a similar purpose. In the housing there is a leaf spring 134 provided with the step 80, which, together with the separator bar, forms the separating device. The feed means is formed by a roller 140 with a retentive covering provided on a further spring 138, which roller locks in the withdrawal direction, but is rotatable in the insertion direction so that it holds firmly the picture that is lowermost in the pile during withdrawal. When the frame parts are in the inserted state, this spring 138, together with a further spring arrangement 142, presses the pile towards the viewing window. When the roller 140 has been pressed down by the separator, a further lead spring arrangement 144, which has previously been held pressed down by runners 148 of the slider member 32/34, holds the separated picture up and holds it firmly against the housing.

The flap 50 is hinged on the side lying opposite the separator bar 72 and locks resiliently beneath the portion 86 by which the device is gripped.

In the embodiment shown in FIGS. 13 to 20, the container 34 is inserted in the housing 30 and there held positively anchored, details of which are not repeated here, nor those of the opening with the flap through which the container is filled. Next to its window opening 44, the container has another opening 200 through which a first roller 140 provided with a retentive covering may be brought into contact with the picture lying freely at the top inside the container. This is effected by closing the housing lid 202, in which next to the first roller 140 there is mounted a second, similar roller 204. Both rollers are provided at their ends with toothed circumferences 206 which mesh with the toothed rack-like upper edges 208 of the longitudinal side pieces 64 of the slider member 32. When the slider member is pulled, the rollers accordingly convey this uppermost picture through a container outlet 210, wherein on the housing there is provided opposite the roller 204 a counter-support 212. During insertion of the slider member, the rollers are disengaged by a free-wheel type arrangement (not shown). So that the first roller 140 comes to rest cleanly against the picture, the pile 38 is pressed upwards by a spring arrangement 216 until the second roller has engaged the picture; for this purpose the spring arrangement is additionally prestressed by the step 218 on the longitudinal side piece of the slider member, which step presses beneath a bend 220 in the spring when the slider member is inserted.

The container rests with two runners 222 on the housing floor and thus provides room for the longitudinal side pieces 64 of the slider member and also for a control bar 224 provided in the middle of the slider member. This control bar may be displaced relative to the slider member for a short distance compared with the slider member stroke, such that as lateral projections 226 run against stop members 228 it remains in the housing compared with the slider member, but upon reinsertion of the slider member is pressed back into the position indicated in FIG. 14. On this control bar there is the sloping guide face 230 which enters between the elements of the counter support 212 in the inserted position. For the last millimeters of the slider member withdrawal, the guide face 230 presses the end edge facing it of the separated picture gently downwards, while the opposite edge is pressed down by an auxiliary spring 234 until it lies in front of the return slot 236 of the container through which the picture is pushed by the stop member 238 on the slider member. A further auxiliary spring arrangement 240 centres the picture edge, while the pile in the container is sufficiently loose (on account of the reduced bias of the spring arrangement 216 when the slider member is pulled out) for the picture not to be crushed upon insertion; refer in particular to FIG. 15 where this spring arrangement is shown inactive on the left-hand side and activated by the slider member on the right-hand side. The counter support 212 has on its underside a sloping face similar to the sloping face 230, along which the edge of the picture is able to slide.

Figure 21:
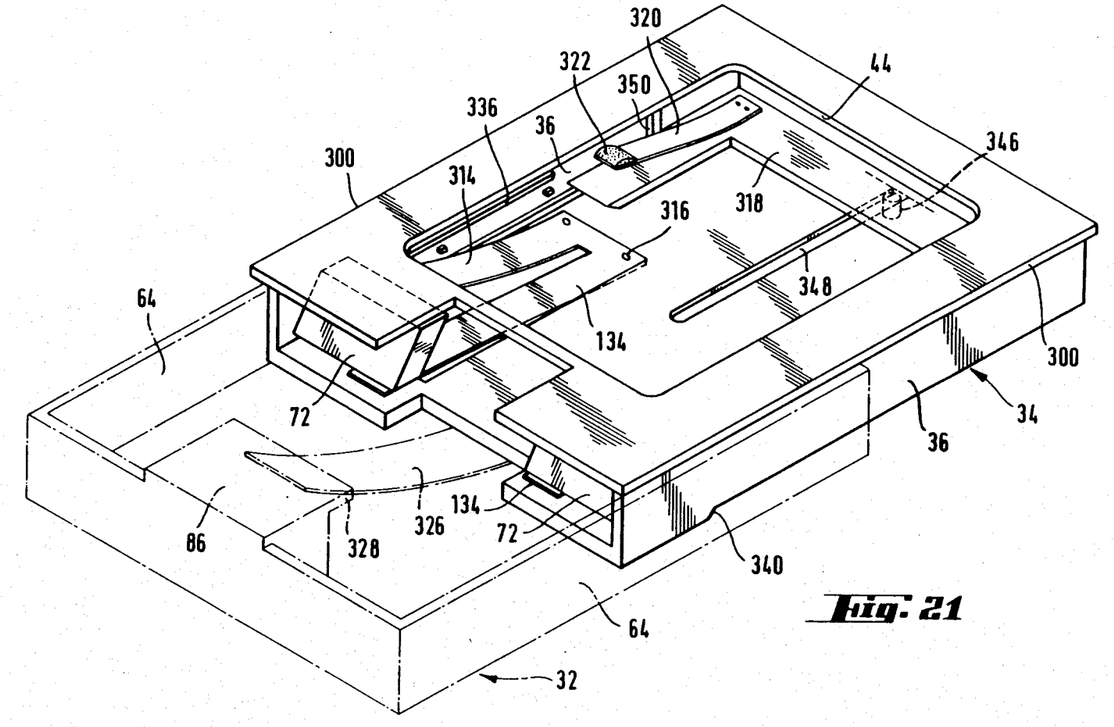
FIG. 21 shows in a perspective view a further embodiment.
Figure 22:
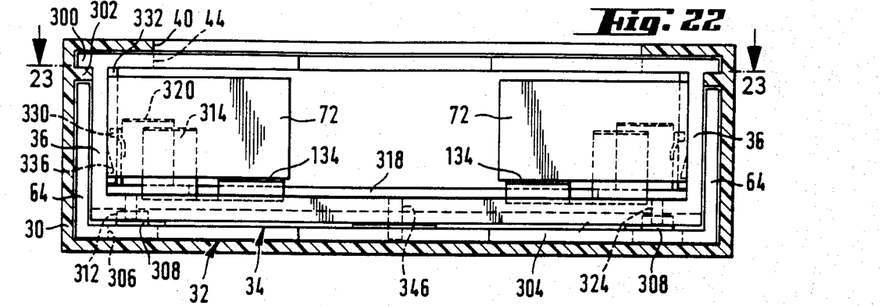
FIGS. 22 and 23 show the device in cross-section and in longitudinally cut plan view, respectively.
Figure 23:
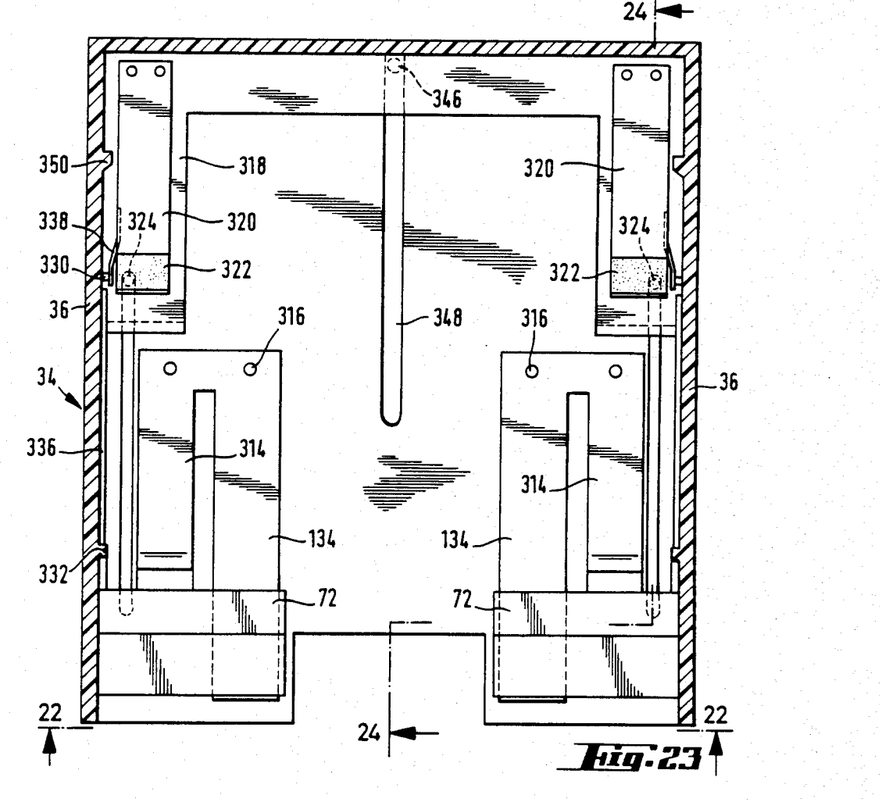
Figure 24:
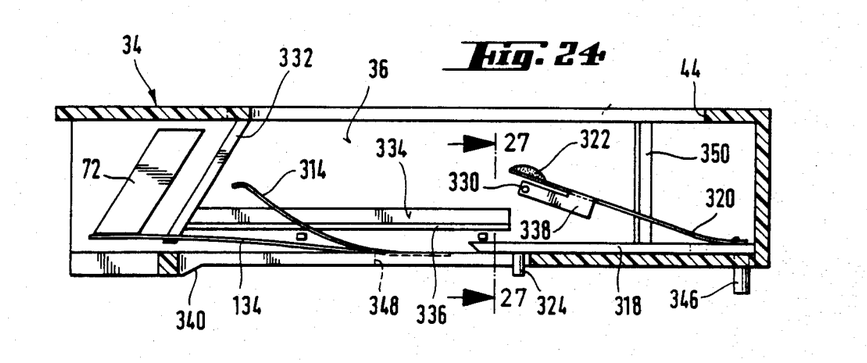
FIGS. 24 and 25 are explanatory accompanying longitudinal sections.
Figure 25:
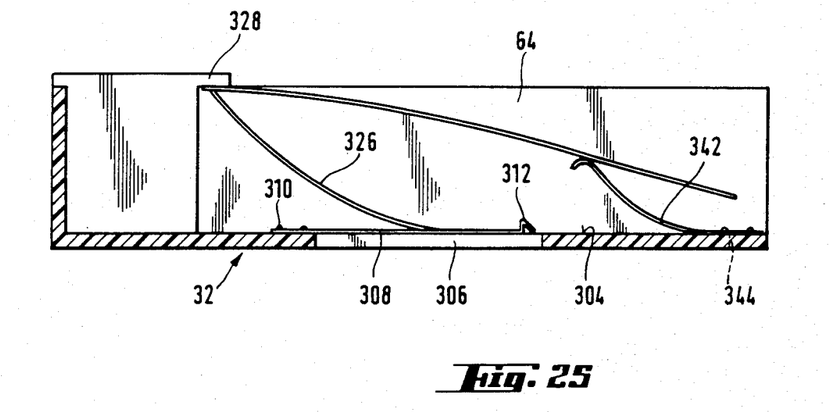
Figure 26:
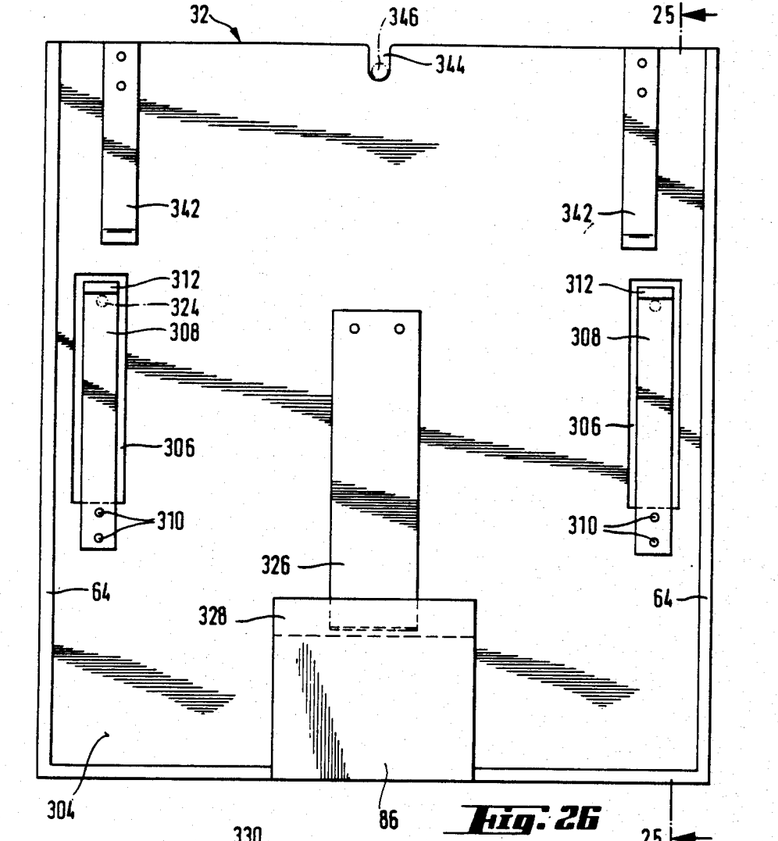
FIG. 26 is a plan view of the accompanying slider member.
Figure 27:
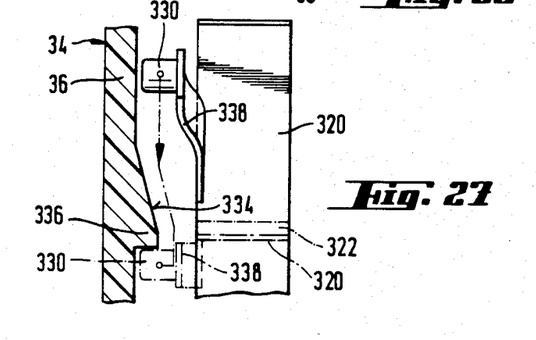
FIG. 27 is a detail plan view to explain the function.

In the embodiment shown in FIGS. 22 to 27, the container contains a series of functional elements for the change-over operation. The container 34 is inserted by its end face on the side of the housing 30 remote from the slider member 32, and rests with lateral rails 300 on ribs 302 on the inside of the housing beneath which the slider side pieces 64 runs. The slider member here has a closed bse 304 apart from openings 306 which provide space for the excursion of the spring arms 308 which are fastened at 310 to the slider member and have transporter hooks 312 at their free ends. The container is provided with wing-like separator members 72 which limit the passage of the separating device jointly with the leaf spring arms 134. The spring arms 134 are constructed in one piece with contact pressure springs 314 for the pile, and are fastened at 316 to a base of the container. Guided laterally in the longitudinal side pieces 36 of the container, the container has a slide piece 318 of approximately U-shaped cross-section, as apparent from FIG. 21. To this slide piece there are fastened two spring arms 320 which carry a retentive covering 322 lying under spring bias against the lowermost picture of the pile (not shown) in the container. From the slide piece 318 carrier pins 324 extend through slots in the container base to the outside next to the spring arms 314 (not shown in FIG. 21), behind which carrier pins engage the carrier hooks 312 of the slider member 32 when this is inserted. If the slider member is now pulled, then the slide piece 318 is also carried along and its retentive coverings guide the picture, on which they are lying, towards the separating device 72/134. On the other side of this, a further resilient clamp 326 fastened to the slider member base, which has until now been held depressed by the container base, is released and holds the leading edge of the picture, which has first passed the separating device, against the extension 328 of the slider member grip 86. Shortly thereafter, a lateral cam 330, which projects outwards from each spring 320, runs onto a cam guideway 332 along which it is pressed downwards so that the retentive coverings 322 loose contact with the pile. Having come down, the cams are deflected laterally inwards by an upper sloping face 334 of a longitudinal rail 336 and pass below this rail; so that this excursion can be effected, the cams are located on small resilient arms 338 of the spring arms 320. In this position the slide piece has also pressed down the springs 314 so that the pile as a whole is held loosely. Directly after this position, the transporter hooks 312 run onto a wedge face 340 on the outside of the container, are thereby lowered into the openings 306 so that they release the slide piece. As the withdrawal of the slider member continues, its lifting springs 342 come free of the container base and are able to present the separated picture in front of the upper opening in the wing-like separator members 72, as indicated in FIG. 25. Pushing back the slide piece as the slider member is reinserted is effected by means of the cut-out 344 in the slider member base, which is of complementary construction with a pin 346 which extends centrally from the slide piece downwards through a slot 348 in the container base. When the slide piece has been fully pushed back, the cams 330 also come free of the rails which until that time had held the retentive covering away from the pile.

The housing has no special features so that it requires no further explanation. The lateral edges of the pictures located in the container are supported by inwardly projecting extensions 350 and the inside of the cam guideway 332.

On the side remote from the wing-like separator members, the container may also have an opening closeable by a lid, through which it is filled.

I claim:

1. Picture viewing device for rectangular pictures of like format comprising: a viewing window, behind which there lies a pile of pictures; first and second frame parts which are able to be pulled apart and pushed back together relative to one another and parallel to the plane of the window; transporting means which, upon a movement of the frame parts backwards and forwards, remove an individual picture at one side of the pile and add it to the other side of the pile, wherein, as the frame parts are pulled apart, the first frame part carries the individual picture with it and the second frame part supports the remainder of the pile; and a removable container containing the pile of pictures and assigned to the second frame part, which container, at an end of the pile facing towards the first frame part, has a picture withdrawal opening and a picture return opening, on which container the side facing towards the viewing window is open, and which allows said transporting means for an individual picture to engage operatively with the pile.

2. Device according to claim 1 wherein the second frame part has a separator bar as a means for supporting the remainder of the pile and the container has an open end face facing the separator bar.

3. Device according to claim 2 wherein the open end face of the container is closeable by a movable cover.

4. Device according to claim 3 wherein the cover is a flap.

5. Device according to claim 4 wherein the flap is supported in a recess of the second frame part in its open position.

6. Device according to claim 1 wherein means for supporting the remainder of the pile are provided in the container.

7. Device according to claim 6 wherein the means for supporting the remainder of the pile are constructed as separator bar elements.

8. Device according to claim 1 wherein the container has a pass-through opening for transporting means for the individual picture arranged in the first frame part.

9. Device according to claim 8 wherein the pass-through opening of the container extends for the entire length of the path of movement of the frame parts.

10. Device according to claim 1 wherein said transporting means is contained in said container and able to be coupled with the first frame part.

11. Device according to claim 10 wherein the first frame part has holding means for the individual picture.

12. Device according to claim 1 wherein an arrangement of contact pressure springs presses the pile against the viewing window when the frame parts have been pushed together, and wherein the contact pressure arrangement is arranged in the first frame part and the container has pass-through openings through which the contact pressure arrangement is in operative connection with the pile.

13. Device according to claim 1 wherein an arrangement of contact pressure springs presses the pile against the viewing window when the frame parts have been pushed together, and wherein the contact pressure arrangement is housed at least partly in the container.

14. Device according to claim 13 wherein the entire contact pressure arrangement is housed in the container.

15. Device according to claim 13 wherein another part of the contact pressure arrangement is housed in one of the frame parts.

16. Device according to claim 1 wherein the container is able to be inserted into a slider member forming one of the frame parts when the slider member is pulled out of a housing forming the first frame part.

17. Device according to claim 16 wherein the container locks automatically as it is inserted into the slider member.

18. Device according to claim 1 wherein one of the frame parts is constructed as a housing provided with the viewing window, wherein the other of the frame parts is constructed as a slider member which is able to be withdrawn from the housing, and wherein the housing can be opened up in order to insert the container.

19. Device according to claim 1 wherein one of the frame parts is constructed as a housing (30) with the viewing window, wherein the other of the frame parts is constructed as a slider member which is able to be withdrawn from the housing, and wherein the slider member is at the same time constructed as a container which is able to be completely removed from the housing.

20. Device according to claim 1 wherein one of the frame parts is constructed as a housing having the viewing window, and wherein the housing has an opening extending transversely to the plane of the viewing window into which the container may be inserted.

21. Device according to claim 1 wherein the picture openings in the container close automatically on removal of the container.

22. Device according to claim 1 wherein the container is able to be inserted into the device only in the position in which it functions correctly.

23. Device according to claim 1 wherein the container has a closeable opening for the insertion of the pile.

24. Device according to claim 23 wherein the picture withdrawal opening and the picture return opening of the container are part of the pile insertion opening.

* * * * *

UNITED STATES PATENT AND TRADEMARK OFFICE
CERTIFICATE OF CORRECTION

PATENT NO. : 4,860,472
DATED : August 29, 1989
INVENTOR(S) : Peter Ackeret

It is certified that error appears in the above-identified patent and that said Letters Patent is hereby corrected as shown below:

| Column | Line | Correction |
|--------|------|------------|
| 2 | 55 | Insert --*-- before "Presumably". |
| 3 | 11 | Change "be" to --by--. |
| 4 | 60 | Change "lead" to --leaf--. |
| 5 | 65 | Change "bse" to --base--. |

Signed and Sealed this

Twenty-fourth Day of September, 1991

Attest:

HARRY F. MANBECK, JR.

Attesting Officer

Commissioner of Patents and Trademarks